(12) United States Patent
Henry et al.

(10) Patent No.: US 11,360,375 B1
(45) Date of Patent: Jun. 14, 2022

(54) STEREOSCOPIC CAMERA ALIGNMENT VIA LASER PROJECTION

(71) Applicant: Rockwell Collins, Inc., Cedar Rapids, IA (US)

(72) Inventors: Daniel J. Henry, Cedar Rapids, IA (US); Nathan A. Vaughn, Hernando, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 14 days.

(21) Appl. No.: 16/814,413

(22) Filed: Mar. 10, 2020

(51) Int. Cl.
*H04N 7/18* (2006.01)
*G03B 35/08* (2021.01)

(52) U.S. Cl.
CPC .................. *G03B 35/08* (2013.01)

(58) Field of Classification Search
CPC .. H04N 13/239; H04N 13/246; H04N 13/296; G03B 35/08; G03B 35/10
USPC .............. 348/47, 187, 42; 360/75
See application file for complete search history.

(56) References Cited

U.S. PATENT DOCUMENTS

| 7,209,161 B2* | 4/2007 | Thal ................. G06T 7/85 348/42 |
| 8,098,275 B2 | 1/2012 | Keating, III et al. |
| 8,866,913 B1* | 10/2014 | Hsieh ................. H04N 17/002 348/187 |
| 10,088,296 B2 | 10/2018 | Hillebrand et al. |
| 2008/0192110 A1* | 8/2008 | Grover ................. H04N 13/243 348/47 |
| 2013/0016186 A1* | 1/2013 | Atanassov ........... H04N 13/239 348/47 |
| 2017/0350968 A1 | 12/2017 | Lane et al. |
| 2018/0300900 A1 | 10/2018 | Wakai et al. |
| 2018/0300901 A1 | 10/2018 | Wakai et al. |

FOREIGN PATENT DOCUMENTS

| JP | 2019020371 A | 2/2019 |
| WO | 2014153429 A1 | 9/2014 |

OTHER PUBLICATIONS

Vilaca, Joao et al., "Stero Vision Calibration Procedure for 3D Surface measurements", IEEE Xplore, DOI: 10.1109/IECON.2006.347777, Conference Paper Dec. 2006, 7 pages.

* cited by examiner

*Primary Examiner* — Jayanti K Patel
*Assistant Examiner* — Richard B Carter
(74) *Attorney, Agent, or Firm* — Suiter Swantz pc llo

(57) ABSTRACT

A system and method for calibrating stereoscopic cameras in an aircraft utilizes a plurality of lasers aimed at a desired convergence point, such as at a point on a runway or other ground facility or projection surface. Each of the stereoscopic cameras are adjusted in terms of pitch, yaw, and roll to align the convergence point in each camera. Misalignments are iteratively corrected, as required. An alignment crosshair is applied, physically or electronically, and the convergence point aligned to the alignment crosshair.

11 Claims, 12 Drawing Sheets

STEREOSCOPIC CAMERA ALIGNMENT VIA LASER PROJECTION

BACKGROUND

Stereoscopic 3D camera systems installed on an aircraft must be properly aligned for optimal 3D imaging performance. Misalignment of the cameras in a 3D camera system will cause a degradation of the 3D effect projected to the user. In some applications, such as air-to-air refueling, a degraded 3D effect can have dangerous consequences. A tanker boom operator can mistakenly scrape a refueling boom along the surface of the aircraft being refueled. On a stealth aircraft, such scraping could damage the stealth coating and jeopardize mission safety.

SUMMARY

In one aspect, embodiments of the inventive concepts disclosed herein are directed to a system and method for calibrating stereoscopic cameras in an aircraft. A plurality of lasers are aimed at a desired convergence point, such as at a point on a runway or other ground facility. Each of the stereoscopic cameras are adjusted in terms of pitch, yaw, and roll to align the convergence point in each camera. Misalignments are iteratively corrected.

In a further aspect, an alignment crosshair is applied, physically or electronically, and the convergence point aligned to the alignment crosshair.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1A:
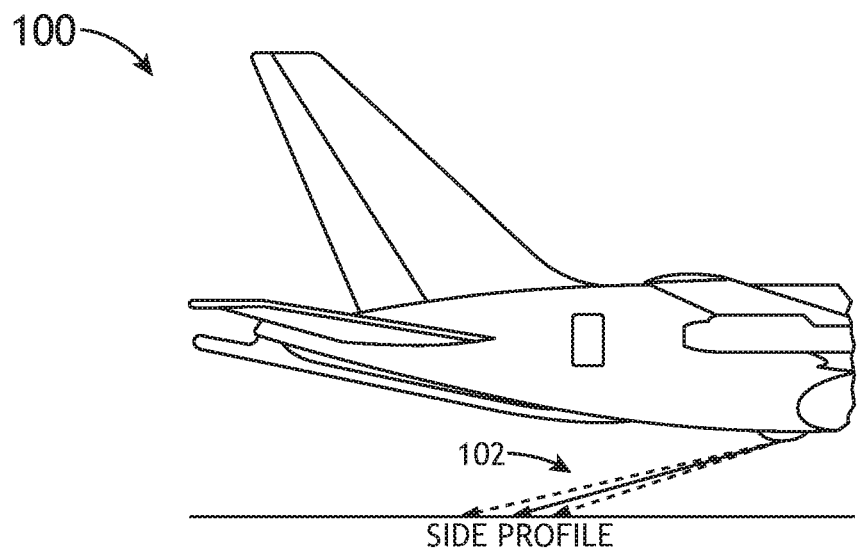
FIG. 1A shows an environmental side view of an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and method for calibrating stereoscopic cameras in an aircraft. A plurality of lasers are aimed at a desired convergence point, such as at a point on a runway or other ground facility. Each of the stereoscopic cameras are adjusted in terms of pitch, yaw, and roll to align the convergence point in each camera. Misalignments are iteratively corrected.

Figure 1B:
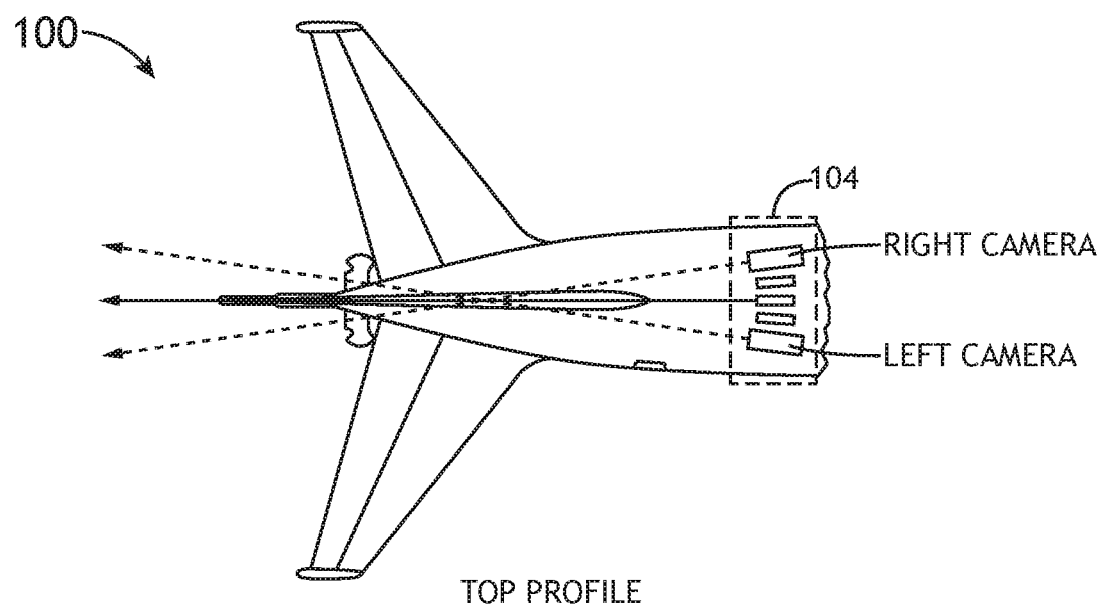
FIG. 1B shows an environmental top view of an exemplary embodiment.

Referring to FIGS. 1A-1B, environmental side and top views of an exemplary embodiment are shown. An aircraft 100 including a stereoscopic camera alignment system 104 according to at least one embodiment projects a plurality of laser beams 102 from different, known locations within the aircraft 100, toward a convergence point. The convergence point is some point a predefined distance from the stereoscopic cameras where it is desirable the stereoscopic cameras be calibrated.

Figure 2:
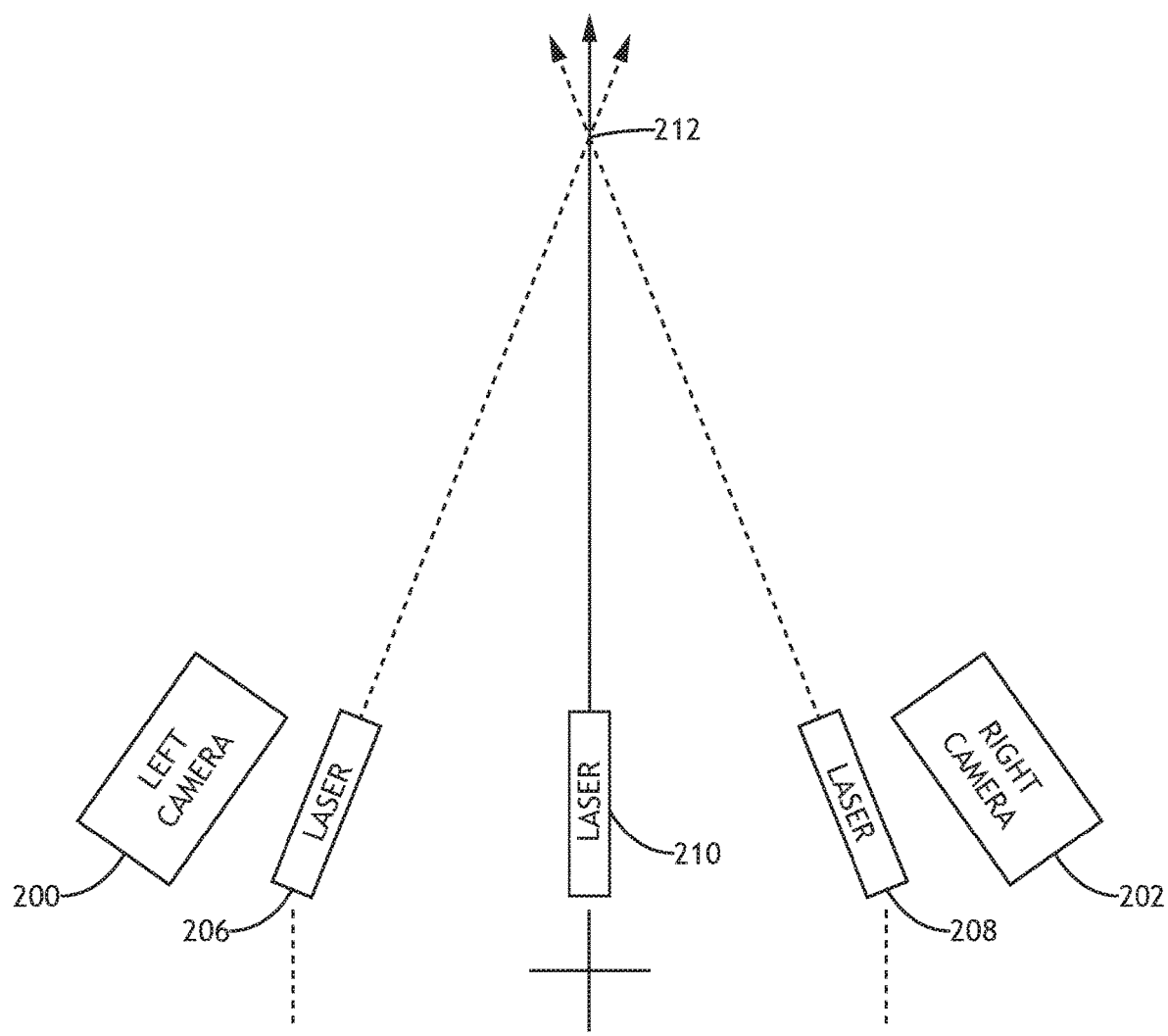
FIG. 2 shows a block diagram of a system according to an exemplary embodiment.

Referring to FIG. 2, a block diagram of a system according to an exemplary embodiment is shown. Where cameras 200, 202 of a stereoscopic camera system require calibration, a set of lasers 206, 208, 210 are aimed at a convergence point 212, within the field of view of each camera 200, 202.

In at least one embodiment, the set of lasers 206, 208, 210 comprises a center, crosshair laser 210. The crosshair laser 210 is projected along a centerline of the stereoscopic system to constrain calibration to the center of the system and prevent divergence toward either the left camera 200 or right camera 202. The convergence point 212 may be defined to conform to some desirable distance along the centerline according to a mission parameter of the stereoscopic system.

In at least one embodiment, the cameras 200, 202 may be parallel to each other, while the readouts of the corresponding camera focal plane for each camera 200, 202 if shifted or transformed. Such shifting results in the same convergence as physical toe-in, but does not introduce distortion (called keystone) in the images of the two cameras. When keystone is introduced, it must be removed via image warping to prevent eye strain in the corners of the image and depth distortion.

One or more intersecting lasers 206, 208 may be used to more precisely define the desirable distance so that the convergence point 212 at the center of the crosshair laser 210 is maintained at that distance.

Figure 3A:
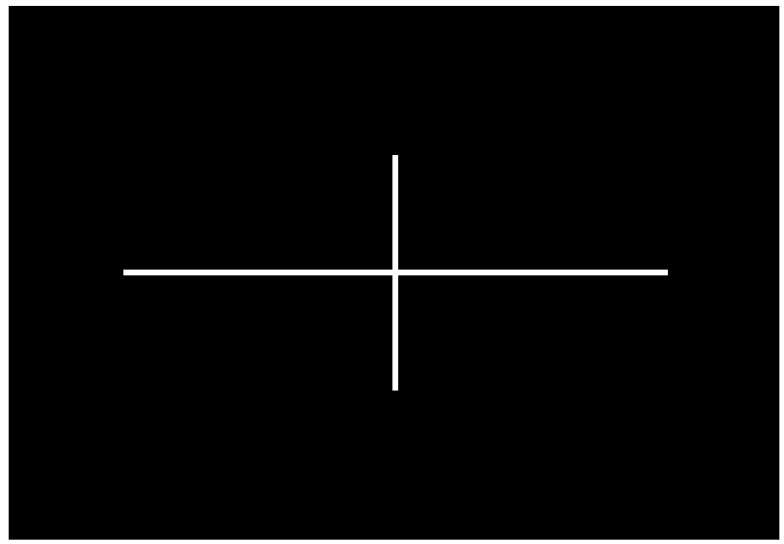
FIG. 3A shows a view as seen through a center camera.
Figure 3B:
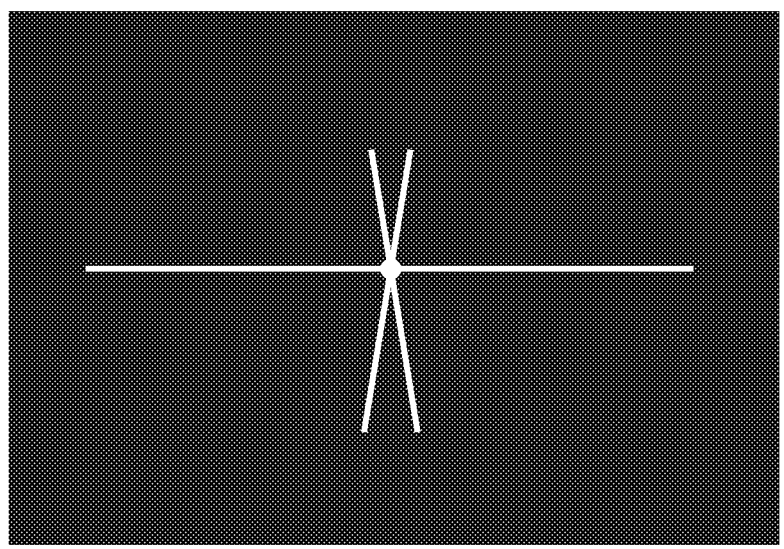
FIG. 3B shows a view as seen through a calibrated stereoscopic camera system.

Referring to FIGS. 3A-3B, views as seen through a center camera 300 and a calibrated stereoscopic camera system 302 are shown. It may be appreciated that the center camera view 300 is hypothetical in nature; the stereoscopic camera system being calibrated may not include a center camera. The calibrated stereoscopic view 302 includes overlapping images of a projected crosshair laser, the views converging on a convergence point for parallax. Horizontal alignment, and alignment at the central convergence point are the desirable factors. It may be appreciated that FIGS. 3A-3B show only the crosshair laser, not any intersecting lasers.

Figure 4:
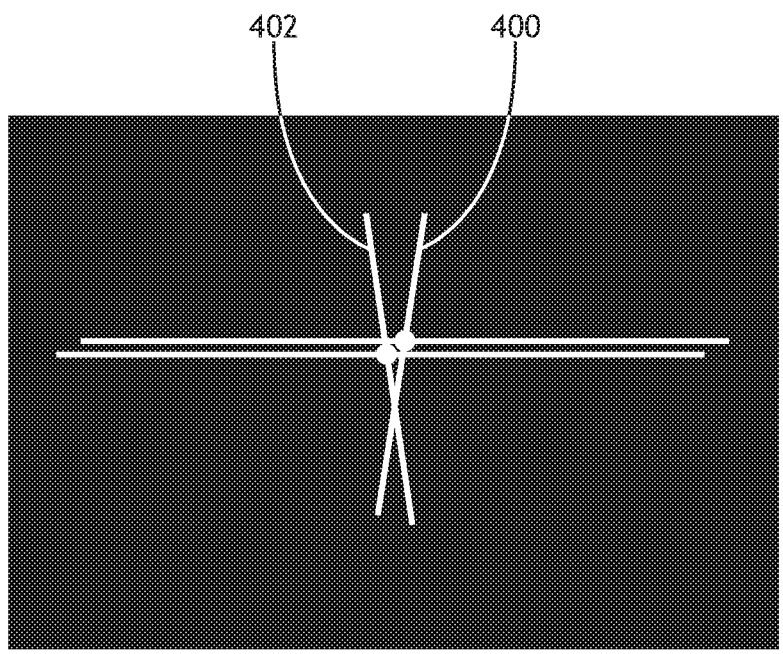
FIG. 4 shows a view as seen through a misaligned stereoscopic camera system.

Referring to FIG. 4, a view as seen through a misaligned stereoscopic camera system is shown. In a misaligned stereoscopic camera system, an image from the right camera 400 and an image from the left camera 402 are misaligned both in terms of horizontal alignment and convergence point.

Figure 5:
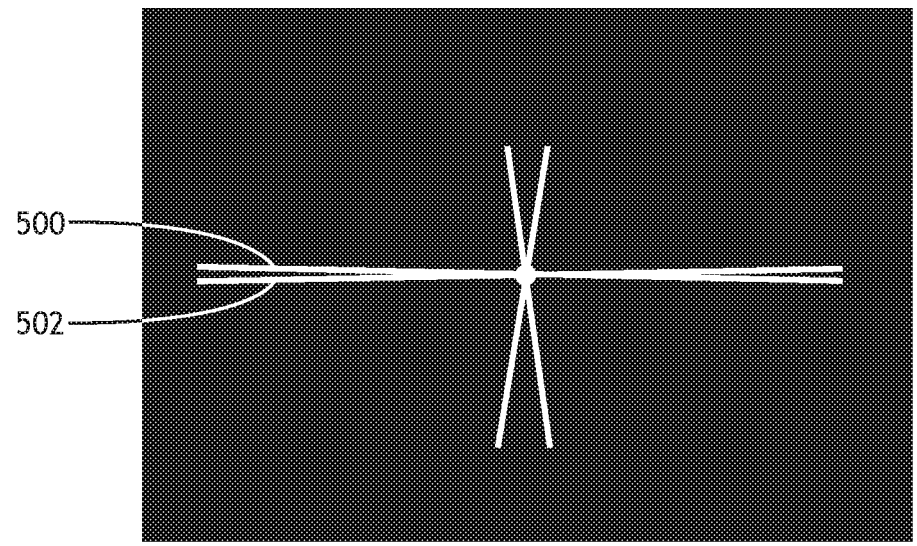
FIG. 5 shows a view during a step of a calibration process according to an exemplary embodiment.

Referring to FIG. 5, a view during a step of a calibration process according to an exemplary embodiment is shown. In a first step, misalignments in images from the left camera and right camera are identified in terms of pitch and or yaw (along vertical and/or horizontal axes with respect to the corresponding camera), and an adjustment (either physical or an image transformation) is determined to align or overlap the central convergence points. It may be appreciated that the process requires substantially contemporaneous adjustment of the left camera and right camera. Simultaneous overlapping views 500, 502 from the left camera and right camera may be used to facilitate such contemporaneous alignment. In at least one embodiment, it may be desirable for at least one camera to apply a filter to facilitate unique identification of the left camera image from the right camera image for automatic calibration.

Figure 6:
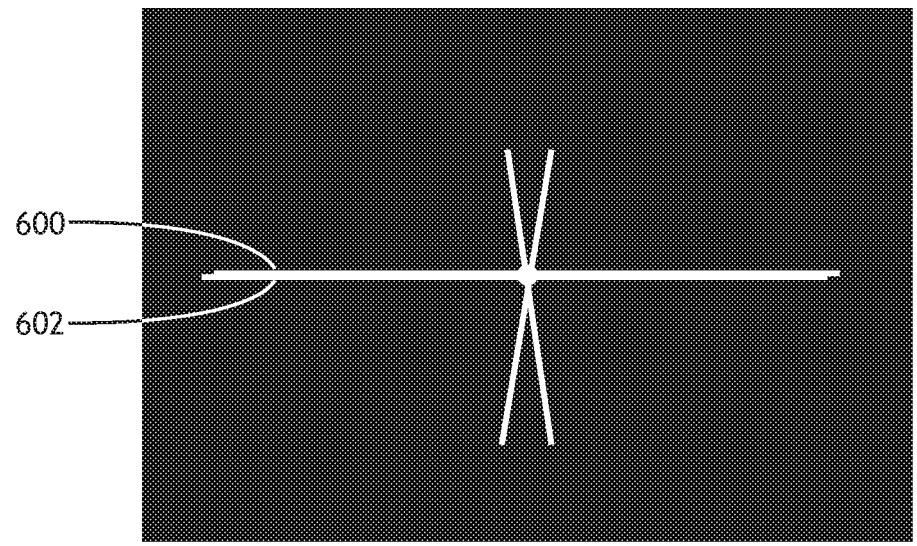
FIG. 6 shows a view during a step of a calibration process according to an exemplary embodiment.

Referring to FIG. 6, a view during a step of a calibration process according to an exemplary embodiment is shown. In a second step, misalignments in images from the left camera and right camera are identified in terms of roll, and an adjustment (either physical or an image transformation) is determined to align or parallelize horizon lines of overlapping views 600, 602 from the left camera and right camera.

Figure 7:
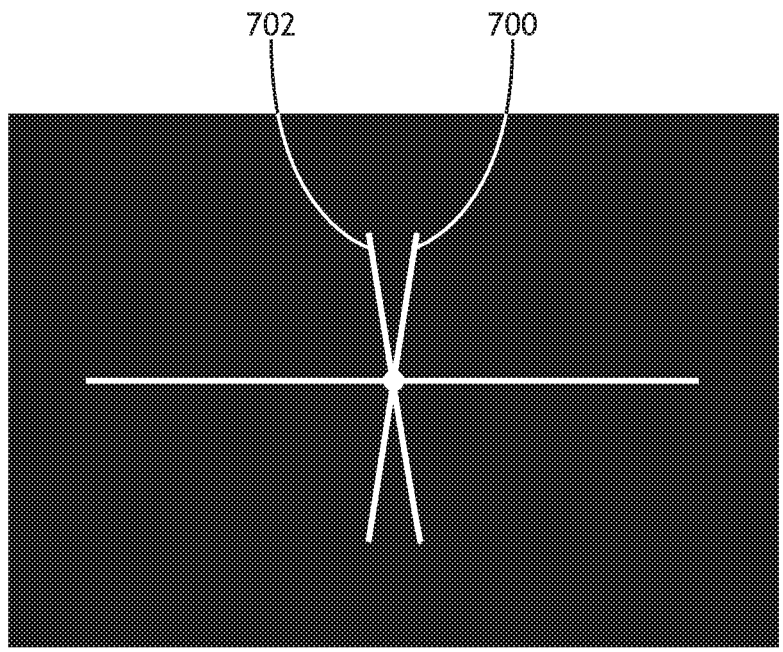
FIG. 7 shows a view during a step of a calibration process according to an exemplary embodiment.

Referring to FIG. 7, a view during a step of a calibration process according to an exemplary embodiment is shown. Because the pitch, yaw, and roll axes of each of the left camera and right camera are related, adjustments to correct misalignments in roll axes are likely to create misalignments in terms of pitch and/or yaw. Therefore, in a third step, new misalignments in the left camera and right camera are iteratively identified and new adjustments in terms of pitch, yaw, and roll are iteratively determined to re-align the central convergence points of the overlapping views 700, 702.

Figure 8A:
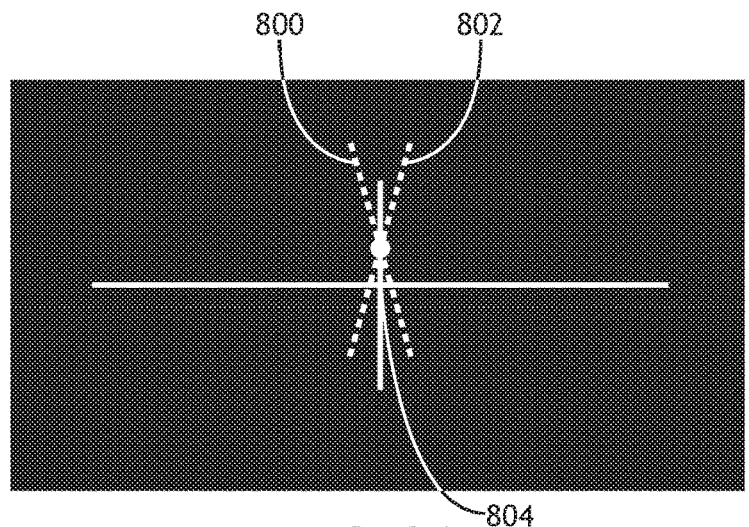
FIG. 8A shows a view during an alignment process according to an exemplary embodiment.
Figure 8B:
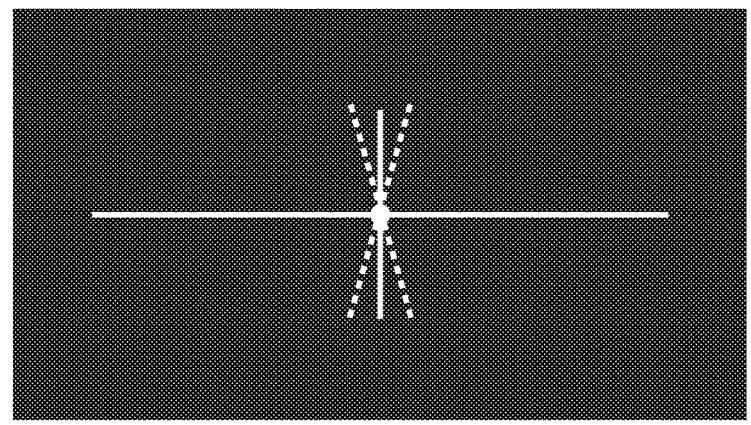
FIG. 8B shows a view during an alignment process according to an exemplary embodiment.
Figure 8C:
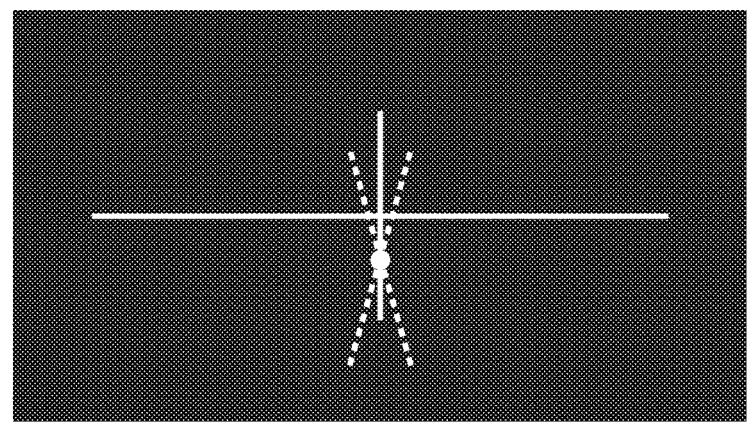
FIG. 8C shows a view during an alignment process according to an exemplary embodiment.

Referring to FIGS. 8A-8C, views during an alignment process according to an exemplary embodiment are shown. In at least one embodiment, a calibration system may project one or more intersecting lines 800, 802 to further align the convergence point 804 of the central crosshair laser to a desired location in camera. FIG. 8B shows a properly located plane of convergence. The intersection of the dashed crosshairs is aligned with the center of the crosshair. FIGS. 8A and 8C show an incorrectly located plane of convergence. If the plan of convergence is either too far or too close, the intersection of the dashed crosshairs will not be aligned with the center of the crosshair.

Figure 9A:
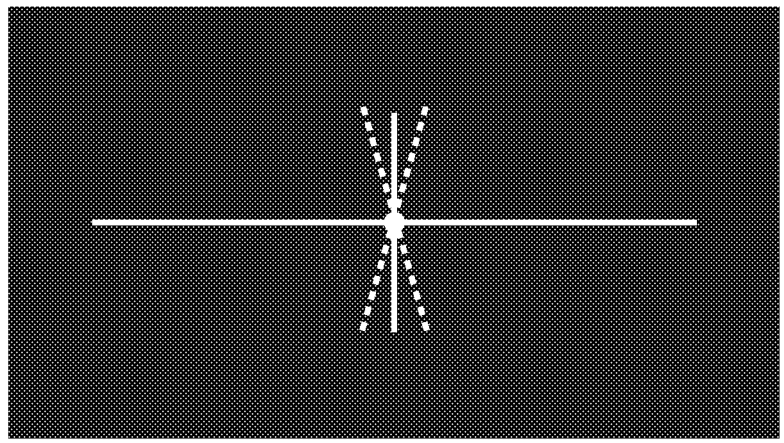
FIG. 9A shows a view as seen through a center camera.
Figure 9B:
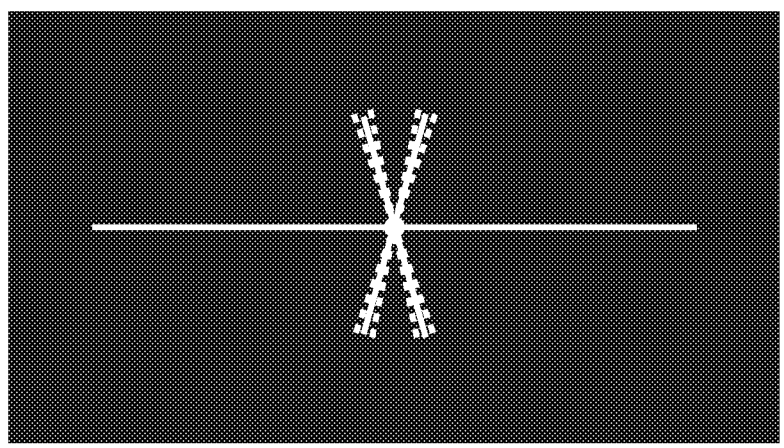
FIG. 9B shows a view as seen through a calibrated stereoscopic camera system.

Referring to FIGS. 9A-9B, views as seen through a hypothetical center camera and a calibrated stereoscopic camera system are shown. The center hypothetical camera view in 9A shows the crosshair laser and projected intersecting lines. The calibrated stereoscopic view includes overlapping images of the crosshair laser and intersecting lines converging on a convergence point.

Figure 10:
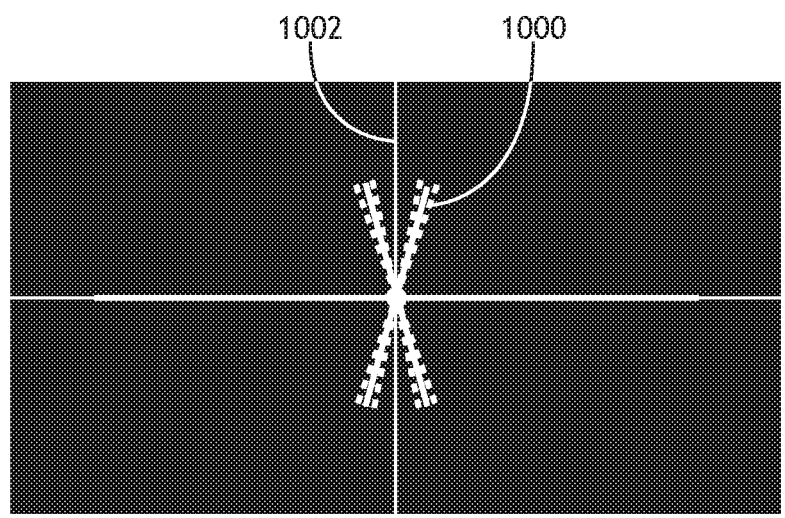
FIG. 10 shows a view as seen through a calibrated stereoscopic camera system.

Referring to FIG. 10, a view as seen through a calibrated stereoscopic camera system is shown. A calibration system may utilize a thin crosshair 1002 or other display reference point, either as a film applied to the display or rendered on the display, to align the horizontal features of the crosshair laser and the convergence point to the display.

Figure 11:
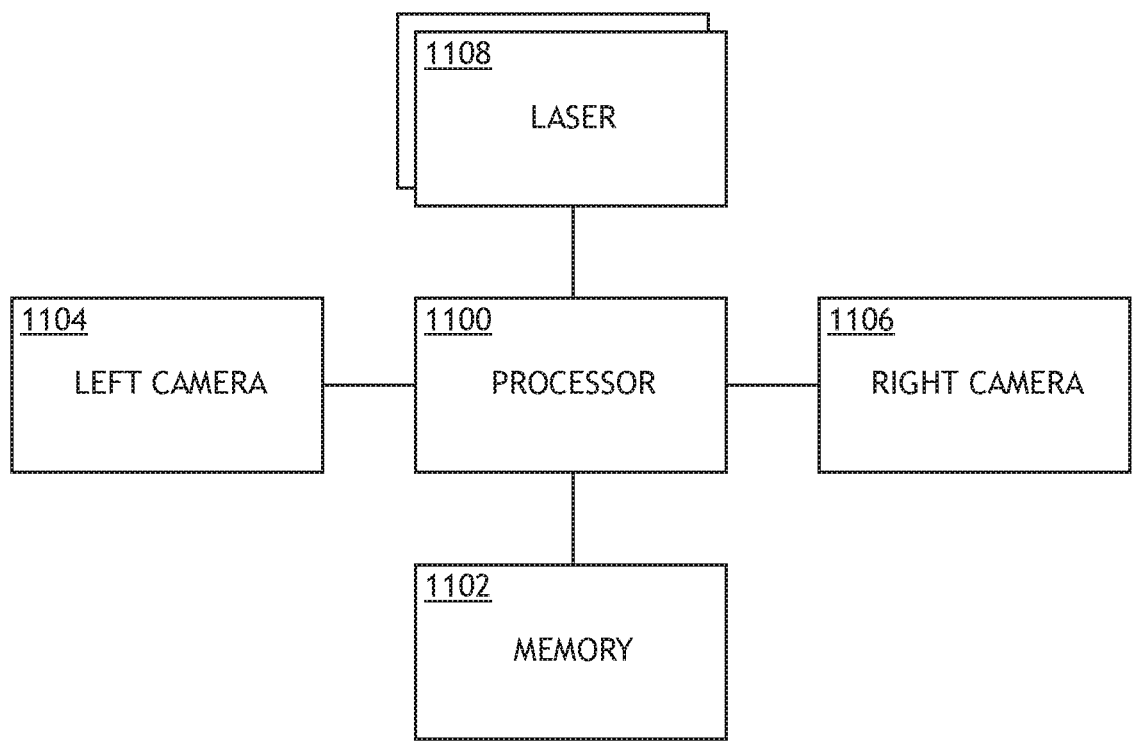
FIG. 11 shows a block diagram of an exemplary embodiment of a stereoscopic calibration system.

Referring to FIG. 11, a block diagram of an exemplary embodiment of a stereoscopic calibration system is shown. The system comprises a processor 1100, non-transitory computer readable medium having a memory 1102 connected to the processor 1100 for storing processor executable code, and a left camera 1104 and right camera 1106 connected to the processor 1100. The left camera 1104 and right camera 1106 are calibrated with respect to one or more laser 1108 projections.

In at least one embodiment, the processor 1100 iteratively identifies misalignments in images from each of the left camera 1104 and right camera 1106, and determines adjustments. In one embodiment, the adjustments may be applied via physical manipulation of the left camera 1104 and right camera 1106. Alternatively, or in addition, the adjustments comprise image transformations applied to streaming images from each of the left camera 1104 and right camera 1106.

In at least one embodiment, the processor 1100 independently analyses images from the left camera 1104 and right camera 1106 to identify misalignments with respect to at least a crosshair laser in the one or more lasers 1108. The processor 1100 iteratively determines transformations to align a convergence point and horizontal features of the crosshair laser in each camera image.

It should be appreciated that, while embodiments discussed herein include a crosshair laser, other embodiments are envisioned.

Figure 12:
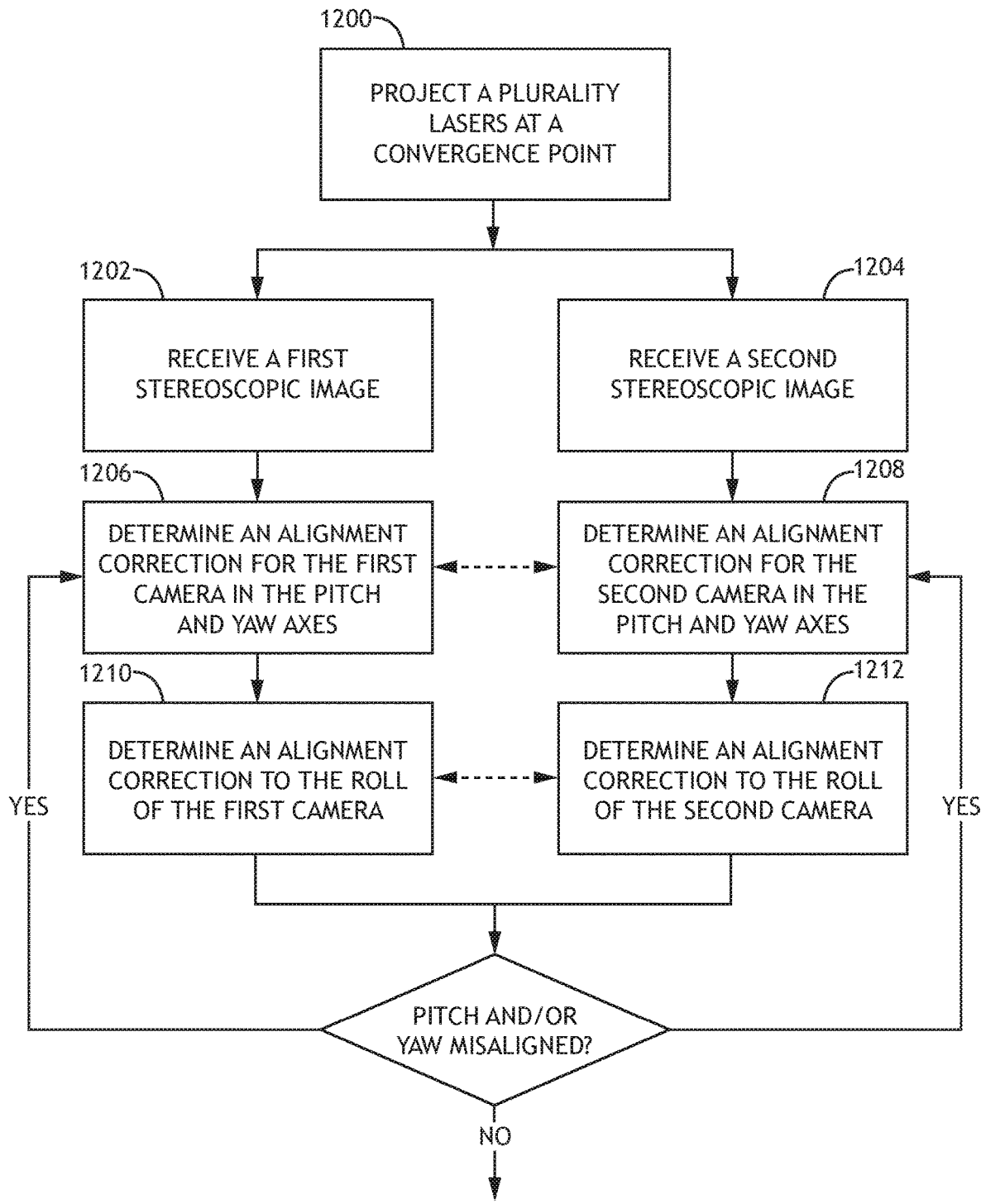
FIG. 12 shows a flowchart of an exemplary embodiment.

Referring to FIG. 12, a flowchart of an exemplary embodiment is shown. A plurality of lasers are projected 1200 at a convergence point within the field of view of a stereoscopic camera system. Images from each of a first camera and second camera are received 1202, 1204; for example, at a calibration display or by a calibration processor. Misalignments are identified via comparison of the received images, to each other, and potentially with respect to a display reference point.

In one embodiment, an alignment correction 1206, 1208 for each of the first camera and second camera is determined with respect to pitch and/or yaw. Likewise, an alignment correction 1210, 1212 for each of the first camera and second camera is determined with respect to roll.

In at least one embodiment, an operator or calibration processor determines 1214 if application of the determined 1206, 1208, 1210, 1212 corrections causes a new misalignment. If so, the process repeats iteratively until the images from the first camera and second camera are aligned with respect to the projected 1200 lasers within an acceptable threshold.

In at least one embodiment, where the corrections comprise image transformations, linear transformation matrices for the first camera and second camera may be stored for later use.

By using a geometry of lasers projected onto a flat surface (such as a runway or portable projection surface), a set of two equally spaced stereoscopic cameras can be calibrated to a defined convergence point through an iterative visual process. Such process enables quick calibration of camera alignment and convergence point, without expensive or complicated equipment, to produce a 3D image on a compatible 3D display.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form hereinbefore described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A method for aligning a stereoscopic camera system comprising:

focusing a plurality of lasers on a convergence point, the plurality of lasers including a crosshair laser defining a centerline of a stereoscopic camera system and two intersecting lasers;

producing an overlapping image from a first stereoscopic camera and a second stereoscopic camera based on the convergence point;

identifying a misalignment in each of the first stereoscopic camera and the second stereoscopic camera along at least one of a pitch or a yaw axis with respect to the convergence point;

contemporaneously applying corrections to the misalignment of the first stereoscopic camera and the second stereoscopic camera along the pitch or yaw axis;

identifying a roll misalignment of one or more of the first stereoscopic camera or the second stereoscopic camera on a roll axis; and applying a correction to the misalignment of the one or more of the first stereoscopic camera or the second stereoscopic camera along the roll axis.

2. The method of claim 1, further comprising:

iteratively identifying misalignments to pitch or yaw of the first stereoscopic camera and second stereoscopic camera; and iteratively applying corrections to the iteratively identified misalignments.

3. The method of claim 1, further comprising:

iteratively identifying roll misalignments to the roll of the first stereoscopic camera and second stereoscopic camera; and iteratively applying corrections to the iteratively identified roll misalignments.

4. The method of claim 1, further comprising:

determining a first transformation to images from the first stereoscopic camera to apply all the corrections to the first stereoscopic camera; and determining a second transformation to images from the second stereoscopic camera to apply all the corrections to the second stereoscopic camera.

5. The method of claim 1, further comprising:

rendering a display reference on a display device;

aligning the convergence point to the display reference in the first stereoscopic camera; and aligning the convergence point to the display reference in the second stereoscopic camera.

6. A system comprising:

a plurality of lasers aimed at a desired convergence point, the plurality of lasers including a crosshair laser defining a centerline of a stereoscopic camera system and two intersecting lasers;

a first stereoscopic camera;

a second stereoscopic camera; and at least one processor in data communication with the first stereoscopic camera, second stereoscopic camera, and a non-transitory computer readable medium having a memory storing processor executable code to configure the at least one processor to:

produce an overlapping image from a first stereoscopic camera and a second stereoscopic camera based on the convergence point;

identify a misalignment in each of the first stereoscopic camera and the second stereoscopic camera along at least one of a pitch or a yaw axis with respect to the convergence point;

contemporaneously apply corrections to the misalignment of the first stereoscopic camera and the second stereoscopic camera along the pitch or yaw axis;

identify a roll misalignment of one or more of the first stereoscopic camera or the second stereoscopic camera on a roll axis; and apply a correction to the misalignment of the one or more of the first stereoscopic camera or the second stereoscopic camera along the roll axis.

7. The system of claim 6, wherein the at least one processor is further configured to:

iteratively identify misalignments to pitch or yaw of the first stereoscopic camera and second stereoscopic camera; and iteratively apply corrections to the iteratively identified misalignments.

8. The system of claim 6, wherein the at least one processor is further configured to:

iteratively identifying roll misalignments to the roll of the first stereoscopic camera and second stereoscopic camera; and iteratively applying corrections to the iteratively identified roll misalignments.

9. The system of claim 6, wherein the at least one processor is further configured to:

determine a first transformation to images from the first stereoscopic camera to apply all the corrections to the first stereoscopic camera; and determine a second transformation to images from the second stereoscopic camera to apply all the corrections to the second stereoscopic camera.

10. The system of claim 6, wherein the at least one processor is further configured to:

render a display reference on a display device;

align the convergence point to the display reference in the first stereoscopic camera; and align the convergence point to the display reference in the second stereoscopic camera.

11. The system of claim 6, wherein the at least one processor is further configured to apply a filter to images from the first stereoscopic camera to distinguish images from the first stereoscopic camera from images from the second stereoscopic camera.

* * * * *